US012110572B2

(12) United States Patent
Blaise et al.

(10) Patent No.: US 12,110,572 B2
(45) Date of Patent: Oct. 8, 2024

(54) MANUFACTURING PROCESS OF PRESS HARDENED PARTS WITH HIGH PRODUCTIVITY

(71) Applicant: ARCELORMITTAL, Luxembourg (LU)

(72) Inventors: Alexandre Blaise, Chantilly (FR); Pascal Drillet, Rozerieulles (FR); Thierry Sturel, Le Ban Saint Martin (FR)

(73) Assignee: ArcelorMittal, Luxembourg (LU)

( * ) Notice: Subject to any disclaimer, the term of this patent is extended or adjusted under 35 U.S.C. 154(b) by 1014 days.

(21) Appl. No.: 16/968,880

(22) PCT Filed: Mar. 5, 2019

(86) PCT No.: PCT/IB2019/051764
§ 371 (c)(1),
(2) Date: Aug. 11, 2020

(87) PCT Pub. No.: WO2019/193434
PCT Pub. Date: Oct. 10, 2019

(65) Prior Publication Data
US 2020/0399734 A1  Dec. 24, 2020

(30) Foreign Application Priority Data

Mar. 9, 2018 (WO) .................. PCT/IB2018/051546

(51) Int. Cl.
*C21D 9/48* (2006.01)
*C21D 1/673* (2006.01)
(Continued)

(52) U.S. Cl.
CPC ............... *C21D 9/48* (2013.01); *C21D 1/673* (2013.01); *C21D 8/0484* (2013.01); *C23C 2/12* (2013.01);
(Continued)

(58) Field of Classification Search
CPC ........ C21D 2211/005; C21D 2211/009; C21D 11/00; C21D 11/005; C21D 6/00;
(Continued)

(56) References Cited

U.S. PATENT DOCUMENTS 5,656,103 A   8/1997  Roberts
6,296,805 B1  10/2001 Laurent et al.
(Continued)

FOREIGN PATENT DOCUMENTS

CN   101466860 A   6/2009
CN   101506402 A   8/2009
(Continued)

OTHER PUBLICATIONS

Windmann et al. "Formation of intermetallic phases in Al-coated hot-stamped 22MnB5 sheets in terms of coating thickness and Si content." 2014. Surface and Coatings technology. 246. p. 17-25. (Year: 2014).*

(Continued)

*Primary Examiner* — Nicholas A Wang
(74) *Attorney, Agent, or Firm* — Davidson Kappel LLC

(57) ABSTRACT

A process for manufacturing a non-stamped prealloyed steel coil, sheet or blank, comprising the following successive steps of: providing a non-stamped precoated steel coil, sheet or blank composed of a steel substrate covered by a precoating of aluminum, or aluminum-based alloy, or aluminum alloy, wherein the precoating thickness is comprised between 10 and 35 micrometers on each side of the steel coil, sheet or blank, then heating the non-stamped steel coil, sheet or blank in a furnace under an atmosphere containing at least 5% oxygen, up to a temperature $\theta_1$ comprised between 750 and 1000° C., for a duration $t_1$ comprised between $t_{1min}$ and $t_{1max}$, wherein: $t_{1min}=23500/(\theta_1-729.5)$ and $t_{1max}=4.946\times10^{41}\times\theta_1^{-13.08}$, $t_1$ designating the total dura- (Continued)

tion in the furnace, $\theta_1$ being expressed in °C. and $t_{1min}$ and $t_{1max}$ being expressed in seconds, then cooling the non-stamped steel coil, sheet or blank at a cooling rate $V_{r1}$ down to a temperature $\theta_i$, then maintaining the non-stamped steel coil, sheet or blank at a temperature $\theta_2$ comprised between 100 and 500° C., for a duration $t_2$ comprised between 3 and 45 minutes, so to obtain a diffusible hydrogen less than 0.35 ppm.

19 Claims, 2 Drawing Sheets

(51) Int. Cl.
  *C21D 8/04* (2006.01)
  *C23C 2/12* (2006.01)
  *C23C 2/26* (2006.01)
  *C23C 2/28* (2006.01)
  *C23C 2/40* (2006.01)

(52) U.S. Cl.
  CPC ............ *C23C 2/261* (2022.08); *C23C 2/28* (2013.01); *C23C 2/29* (2022.08); *C23C 2/40* (2013.01); *C21D 2211/005* (2013.01); *C21D 2211/009* (2013.01)

(58) Field of Classification Search
  CPC .. C21D 1/673; C23C 2/12; C23C 8/80; B21D 22/022
  See application file for complete search history.

(56) References Cited

U.S. PATENT DOCUMENTS

| | | | |
|---|---|---|---|
| 8,349,098 B2 | 1/2013 | Macherey | |
| 8,992,704 B2 | 3/2015 | Maki et al. | |
| 10,590,522 B2 | 3/2020 | Oh et al. | |
| 11,339,479 B2 | 5/2022 | Koll et al. | |
| 2011/0174418 A1* | 7/2011 | Maki | C22C 38/06 148/333 |
| 2012/0085467 A1 | 4/2012 | Thirion et al. | |
| 2016/0222484 A1* | 8/2016 | Köyer | C22C 38/38 |
| 2017/0253941 A1 | 9/2017 | Cobo et al. | |
| 2017/0268078 A1 | 9/2017 | Sanadres et al. | |
| 2017/0321314 A1 | 11/2017 | Kolnberger et al. | |
| 2019/0040513 A1 | 2/2019 | Koll et al. | |
| 2019/0106760 A1* | 4/2019 | Yamashita | C22C 38/001 |
| 2020/0017948 A1* | 1/2020 | Van Schoonevelt | C23C 2/40 |
| 2020/0165712 A1 | 5/2020 | Beentjes et al. | |

FOREIGN PATENT DOCUMENTS

| | | | |
|---|---|---|---|
| CN | 101688284 A | | 3/2010 |
| CN | 102791901 A | | 11/2012 |
| CN | 105154775 A | | 12/2015 |
| CN | 106795613 A | | 5/2017 |
| DE | 102015209660 | * | 12/2016 |
| DE | 102016102504 | | 8/2017 |
| DE | 102016107152 | | 10/2017 |
| EP | 2 377965 | | 10/2011 |
| FR | 2780984 | | 1/2000 |
| FR | 2780984 A1 | | 1/2000 |
| JP | S62199759 A | | 9/1987 |
| JP | 2002012963 A | | 1/2002 |
| JP | 2004360022 A | | 12/2004 |
| JP | 2009293078 | | 12/2009 |
| JP | 2011219803 A | | 11/2011 |
| JP | 2018527461 A | | 9/2018 |
| KR | 20050013654 A | | 2/2005 |
| KR | 20100001180 A | | 1/2010 |
| KR | 20120089084 A | | 8/2012 |
| KR | 2013 0014520 A | | 2/2013 |
| SU | 1364242 A3 | | 12/1987 |
| SU | 1555374 A1 | | 4/1990 |
| WO | WO2008053273 | | 5/2008 |
| WO | WO 2009090443 A1 | | 7/2009 |
| WO | WO2009095427 | | 8/2009 |
| WO | WO2010005121 | | 1/2010 |
| WO | WO 2011104443 A1 | | 9/2011 |
| WO | WO 2013100615 A1 | | 7/2013 |
| WO | WO2017111525 | | 6/2017 |
| WO | WO 2018158165 | | 9/2018 |

OTHER PUBLICATIONS

Abstract of Yu Wu-Gang, Zhang Jie. "Influence of pre-alloying time on zinc-based coatings of hot forming steel in structure and component[J]". Iron and Steel, 2017, 52(7): 84-88.
International Search Report of PCT/IB2019/051764 , Jun. 6, 2019.
Windmann M et al: "Formation of intermetallic phases in Al-coated hot-stamped 22MnB5 sheets in terms of coating thickness and Si content", Surface and Coatings Technology, vol. 246, Mar. 11, 2014.

* cited by examiner

MANUFACTURING PROCESS OF PRESS HARDENED PARTS WITH HIGH PRODUCTIVITY

The invention relates to a process for manufacturing parts, made out of aluminized precoated steel sheets which are heated, press formed and cooled so as to obtain so-called press hardened or hot press formed parts. These parts with high yield and tensile strength ensure anti-intrusion or energy-absorption functions in cars or trucks vehicles.

BACKGROUND

For the manufacturing of recent Body in White structures in the automotive industry, the press hardening process, also called the hot stamping or the hot press forming process, is a fast growing technology for the production of steel parts with high mechanical strength, which makes it possible to achieve weight reduction together with high resistance in case of vehicles collisions.

The implementation of press hardening using aluminized precoated sheets or blanks is known in particular from the publications FR2780984 and WO2008053273: a heat treatable aluminized steel sheet is cut to obtain a blank, heated in a furnace and rapidly transferred into a press, hot formed and cooled in the press dies. During the heating in the furnace, the aluminum precoating is alloyed with the steel of the substrate, thus forming a compound ensuring the protection of the steel surface against decarburization and scale formation. The heating is performed at a temperature which makes it possible to obtain partial or total transformation of the steel substrate into austenite. The austenite transforms during the cooling resulting from the heat extraction from the press dies, into microstructural constituents such as martensite and/or bainite, thus achieving structural hardening of the steel. High hardness and mechanical strength are thereafter obtained after press hardening.

In a typical industrial process, a pre-coated aluminized steel blank is heated in a furnace for a total duration of 3-10 minutes up to a temperature of 880-930° C. in order to obtain a full austenitic microstructure in the substrate and thereafter transferred rapidly into a forming press. It is immediately hot-formed into the desired part shape and simultaneously hardened by die quenching. With a 22MnB5 steel composition, the cooling rate must be higher than 50° C./s if full martensitic structure is desired even in the deformed zones of the part. Starting from an initial tensile strength of about 500 MPa, the final press hardened part has a fully martensitic microstructure and an Ultimate Tensile Strength value of about 1500 MPa.

For sake of productivity, it is desired to reduce as much as possible the heating duration of the pre-coated aluminized blank. For shortening this duration, WO2009095427 proposes to perform a first incomplete alloying of the aluminized blank, before a second heating and press hardening. In the first step, incomplete alloying takes place, the aluminum precoating is alloyed over at least 50% of its thickness with Fe. This first incomplete alloying step is achieved in practice through batch annealing for a few hours in a temperature range of 500° C. up to Ac1 (this temperature designating when austenite appears on heating) or through continuous annealing at 950° C. for 6 minutes. After this first step, the sheet is heated to a temperature higher than Ac1 and press hardened.

WO2010005121 discloses performing a first heat treatment of aluminized steel sheets through batch annealing in the range of 600-750° C. for a duration comprised between 1 hour and 200 hours. After this first step, the sheet is heated to a temperature higher than 700° C. and hot stamped.

WO2017111525 discloses also a first heat treatment in order to lower the risk of aluminum melting in the furnaces and to lower the hydrogen content. This first treatment is performed in the range of 450-700° C., for a duration comprised between 1 and 100 h. After this first heat treatment, the sheet is heated and hot-press formed.

However, the annealing treatments mentioned above have the following drawbacks or insufficiencies:
- due to the somewhat porous nature of the coating created by the first heat treatment above, the hydrogen content of the press hardened part can be high. As the mechanical stress applied to the press hardened parts can be also high, i.e. as the yield stress can exceed 1000 MPa, the risk of delayed fracture induced by the combination of stress, diffusible hydrogen and microstructure, is also increased. It is thus desirable to have a process wherein the average diffusible hydrogen is less than 0.40 ppm in the press hardened part, preferably less than 0.30 ppm, and very preferably less than 0.25 ppm;
- the hydrogen intake during the second heating step (i.e. the step immediately preceding the hot press forming step) is also significant. This can occur because water vapor from the furnace atmosphere is adsorbed at the surface of the blank. The avoidance of such hydrogen intake requests costly solutions such as the use of inert gas or the strict control of the dew point in the heating furnace in the second step. It is desirable to have a process wherein the average hydrogen intake $\Delta H_{diff}$ during the second heating step is less than 0.10 ppm.
- The press hardened parts must be able to be joined by resistance spot welding. This means in particular that the domain of welding intensity, defined by the welding intensity range, must be sufficiently wide and for example at least 1 kA wide. As disclosed in document WO2009090443, a coating structure comprising four layers in the coating after press hardening, makes it possible to obtain such weldability range. Thus, it is desirable to have a process which make it possible to manufacture a press hardened part with a layered coating structure similar to the one described in document WO2009090443, so that the setting parameters of the spot welding machines do not have to be modified.
- As the batch annealing treatments mentioned above for producing incompletely alloyed steel sheets are long and costly, a more productive method is desirable.

It is also desirable to have a manufacturing process wherein:
- the second heating step does not cause the formation of liquid phase in the coating. Since blanks or sheets are generally heated in furnaces on ceramic rollers, the absence of liquid would make it possible to avoid the pollution of the rollers by liquid, and the need of regular inspection or replacement of rollers;
- the second heating step can be performed at an increased heating rate, i.e. with a reduced total duration up to the austenitization temperature and soaking. The heating duration, defined by the amount of time elapsed between 20 and 700° ($\Delta T_{20-700°}$) increases with the blank or sheet thickness th. It is desired to heat the blank or sheet with a duration expressed in s., less than ((26.22×th)−0.5), th being expressed in mm. Thus, the heating cycle would be highly productive and would result in reduction of the manufacturing time.

SUMMARY OF THE INVENTION

The present invention provides a process for manufacturing a non-stamped prealloyed steel coil, sheet or blank, comprising the following successive steps:
  providing a non-stamped precoated steel coil, sheet or blank composed of a heat-treatable steel substrate covered by a precoating of aluminum, or aluminum-based alloy, aluminium-based alloy designating an alloy wherein aluminum is the main element in weight percentage, or aluminum alloy, aluminium alloy designating an alloy wherein aluminum is higher than 50% in weight, the precoating resulting directly from a hot-dip aluminizing process without additional heat treatment, wherein the precoating thickness is comprised between 10 and 35 micrometers on each side of the steel coil, sheet or blank, then
  heating the non-stamped steel coil, sheet or blank in a furnace under an atmosphere containing at least 5% oxygen, up to a temperature $\theta_1$ comprised between 750 and 1000° C., for a duration $t_1$ comprised between $t_{1min}$ and $t_{1max}$, wherein:

$$t_{1min}=23500/(\theta_1-729.5) \text{ and}$$

$$t_{1max}=4.946\times10^{41}\times\theta_1^{-13.08},$$

$t_1$ designating the total duration in the furnace,
  $\theta_1$ being expressed in ° C. and $t_{1min}$ and $t_{1max}$ being expressed in seconds, then
  cooling the non-stamped steel coil, sheet or blank at a cooling rate $V_{r1}$ down to a temperature $\theta_i$, then
  maintaining the non-stamped steel coil, sheet or blank at a temperature $\theta_2$ comprised between 100 and 500° C., for a duration $t_2$ comprised between 3 and 45 minutes, so as to obtain a diffusible hydrogen content less than 0.35 ppm.

According to a process embodiment, the non-stamped prealloyed steel coil, sheet or blank, contains an interdiffusion layer between the steel substrate and the coating, with a thickness comprised between 2 and 16 micrometers, the interdiffusion layer being a layer with an $\alpha$(Fe) ferritic structure, having Al and Si in solid solution.

According to another process embodiment, the non-stamped prealloyed steel coil, sheet or blank comprises an alumina-containing oxide layer atop with a thickness higher than 0.10 µm.

Preferably, $V_{r1}$ is selected so that the sum of the area fractions of bainite and martensite is less than 30% in the steel substrate, after said cooling $V_{r1}$ and before subsequent heating.

Also preferably, $V_{r1}$ is selected so as to obtain a ferrite-pearlite structure in the steel substrate after said cooling $V_{r1}$ and before subsequent heating.

In another process embodiment, the temperature $\theta_2$ is higher than or equal to 100° C. and lower than 300° C.

The temperature $\theta_2$ is preferably higher than or equal to 300° C. and lower than or equal to 400° C.

In another preferred embodiment, $\theta_2$ is higher than 400° C. and less than or equal to 500° C.

The duration $t_2$ is preferably comprised between 4 and 15 minutes.

In a particular embodiment, $\theta_i$ is equal to room temperature and the non-stamped coil sheet or blank, after cooling at room temperature, is heated up to temperature $\theta_2$.

In another particular embodiment, $\theta_i$ is equal to temperature $\theta_2$.

In another embodiment, immediately after maintaining the non-stamped coil, steel sheet or blank at a temperature $\theta_2$ comprised between 100 and 500° C. for a duration $t_2$, the non-stamped steel coil, sheet or blank is cooled down to room temperature.

The invention relates also to a non-stamped prealloyed steel coil, sheet or blank, comprising a heat-treatable steel substrate covered by an alloyed precoating containing aluminum and iron, aluminum not being present as free aluminum, wherein the non-stamped prealloyed steel coil, sheet or blank contains an interdiffusion layer at the interface between the steel substrate and the precoating, with a thickness comprised between 2 and 16 micrometers, the interdiffusion layer being a layer with an $\alpha$(Fe) ferritic structure, having Al and Si in solid solution.

According to an embodiment, the non-stamped prealloyed steel coil, sheet or blank comprises an alumina-containing oxide layer atop the alloyed precoating, with a thickness higher than 0.10 µm.

According to another embodiment, the diffusible hydrogen is less than 0.35 ppm.

The thickness of the non-stamped prealloyed steel coil, sheet or blank is preferably comprised between 0.5 and 5 mm.

In another embodiment, the steel substrate of the non-stamped prealloyed steel coil, sheet or blank has a non-uniform thickness.

Preferably, the sum of the area fractions of bainite and martensite is less than 30% in the steel microstructure.

Also preferably, the steel substrate of the non-stamped prealloyed steel coil, sheet or blank has a ferrite-pearlite microstructure.

The invention relates also to a process for manufacturing a press hardened coated steel part, wherein:
  a non-stamped prealloyed steel coil, sheet or blank according to any one of the embodiments above, or manufactured according to any one of the embodiments above, is provided, then
  if the non-stamped prealloyed steel sheet, coil or blank is in the form of coil or sheet, cutting the coil or sheet so to obtain a prealloyed steel blank, then
  heating the non-stamped prealloyed steel blank such that the heating duration $\Delta T_{20-700°}$ between 20 and 700° C., expressed in s, is less than $((26.22\times th)-0.5)$, th being the thickness, expressed in millimeters, of the prealloyed steel blank, up a temperature $\theta_3$, and maintaining the non-stamped prealloyed steel blank at temperature $\theta_3$ for a duration $t_3$ so to obtain partial or total austenitic structure in the steel substrate, then
  transferring the heated blank into a press, then
  hot press forming the heated blank so to obtain a part, then
  cooling the part while maintaining it in the press tooling, so as to obtain a microstructure in the steel substrate comprising at least martensite and/or bainite, and to obtain a press hardened coated part.

In a particular process embodiment, the non-stamped prealloyed steel blank manufactured according to any one of the process embodiments above is provided, the non-stamped prealloyed steel blank being not cooled at room temperature between maintaining at the temperature $\theta_2$ and heating at the temperature $\theta_3$.

In another process embodiment, the difference $\Delta H_{diff}$ between the content of diffusible hydrogen in the press hardened coated part and the content of diffusible hydrogen in the non-stamped prealloyed blank, is less than 0.10 ppm.

Preferably, the heating of the non-stamped prealloyed steel blank up to temperature $\theta_3$ is performed by a method selected among induction heating, resistance heating or conduction heating.

According to another preferred process embodiment, the microstructure of the steel substrate of the press hardened coated part comprises more than 80% of martensite.

In another process embodiment, the press hardened coated part has a yield stress higher than 1000 MPa.

The invention relates also to the use of a press hardened part manufactured according to any one of the embodiments above, for the fabrication of structural or safety parts of vehicles.

BRIEF DESCRIPTION OF THE DRAWINGS

The invention will now be described in details and illustrated by examples without introducing limitations, with reference to the appended figures among which.

DETAILED DESCRIPTION

Figure 1:
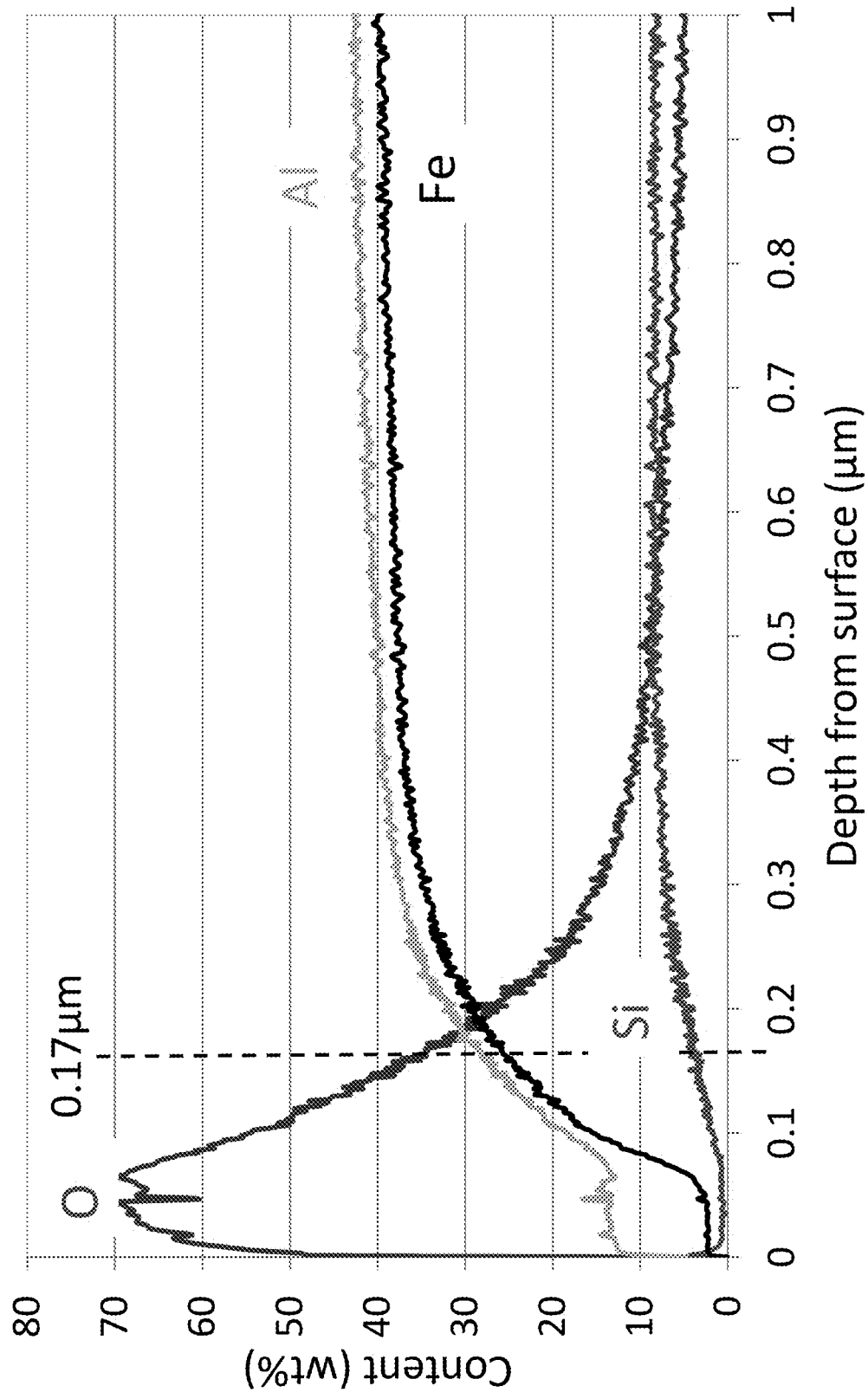
FIG. 1 illustrates the variation of O, Al, Si, Fe, at the surface of a non-stamped prealloyed steel blank according to the invention, as measured by Glow Discharge Optical Emission Spectroscopy technique.

A steel sheet coil, or blank is provided, with a thickness ranging from 0.5 to 5 mm. In a preferred range, the thickness is comprised between 0.5 and 2.5 mm. Depending on its thickness, it can be produced by hot rolling or hot rolling followed by cold rolling. Below 0.5 mm thick, it is difficult to manufacture press hardened parts fulfilling the stringent flatness requirements. Above a sheet thickness of 5 mm, thermal gradients across the thickness can occur during heating or cooling steps, which can cause microstructural, mechanical or geometrical heterogeneities.

This initial product can be under the form of coil, which is itself obtained from coiling of a rolled strip. It can be also under the form of strip, obtained for example after uncoiling and cutting a coil. Alternatively, it can be under the form of a blank, obtained for example from blanking or trimming of unwound coils or strips, the contour shape of this blank being more or less complex in relationship with the geometry of the final press hardened part.

The initial product can have a uniform thickness. It can have also a non-uniform thickness within the range mentioned above. In the latter case, it can be obtained by processes known by themselves, such as tailored welding of blanks or tailored rolling. Thus, tailored welded blanks resulting from the welding of sheets having different thicknesses, or tailored rolled blanks, can be implemented.

The coil, sheet or blank is composed of a flat steel substrate precoated with aluminum, or with aluminum-based alloy, or with aluminum alloy. Thus, at his stage, this flat steel substrate, under the form of coil, sheet, or blank, has not been submitted to any stamping operation in view of obtaining the final part geometry.

The steel of the substrate is a heat treatable steel, i.e. a steel having a composition which makes it possible to obtain martensite and/or bainite after heating in the austenite domain and further quenching by rapid cooling. The steel composition is not especially limited, however the invention is advantageously implemented with steel compositions that make it possible to obtain a yield stress higher than 1000 MPa after press hardening.

With this regard, the steel composition may contain the following elements, expressed in weight %:

0.06%≤C≤0.1%, 1.4%≤Mn≤1.9% and optional additions of less than 0.1% Nb, less than 0.1% Ti, less than 0.010% B, the remainder being iron and unavoidable impurities resulting from the elaboration;

0.15%≤C≤0.5%, 0.5%≤Mn≤3%, 0.1%≤Si≤1%, 0.005%≤Cr≤1%, Ti≤0.2%, Al≤0.1%, S≤0.05%, P≤0.1%, B≤0.010%, the remainder being iron and unavoidable impurities resulting from processing;

0.20%≤C≤0.25%, 1.1%≤Mn≤1.4%, 0.15%≤Si≤0.35%, ≤Cr≤0.30%, 0.020%≤Ti≤0.060%, 0.020%≤Al≤0.060%, S≤0.005%, P≤0.025%, 0.002%≤B≤0.004%, the remainder being iron and unavoidable impurities resulting from processing;

0.24%≤C≤0.38%, 0.40%≤Mn≤3%, 0.10%≤Si≤0.70%, 0.015%≤Al≤0.070%, Cr≤2%, 0.25%≤Ni≤2%, 0.015%≤Ti≤0.10%, Nb≤0.060%, 0.0005%≤B≤0.0040%, 0.003%≤N≤0.010%, S≤0.005%, P≤0.025%, %, the remainder being iron and unavoidable impurities resulting from processing.

These compositions make it possible to achieve different levels of yield and tensile stress after press hardening.

The precoating can be aluminum, or aluminum-based alloy (i.e. aluminum is the main element in weight percentage of the precoating) or aluminum alloy (i.e. aluminum is higher than 50% in weight in the precoating)

The steel sheet can be obtained by hot-dipping in a bath at a temperature of about 670-680° C., the exact temperature depending on the composition of the aluminium based alloy or the aluminium alloy. A preferred precoating is Al—Si which is obtained by hot-dipping the sheet in a bath comprising, by weight, from 5% to 11% of Si, from 2% to 4% of Fe, optionally from 0.0015 to 0.0030% of Ca, the remainder being Al and impurities resulting from the smelting. The features of this precoating are specifically adapted to the thermal cycles of the invention.

The precoating results directly from the hot-dip process, which means that, at this stage, no additional heat treatment is performed on the product directly obtained by hot-dip aluminizing, before the heating steps which will be detailed below.

The precoating thickness on each side of the steel coil, sheet, or blank is comprised between 10 and 35 µm. For a precoating thickness less than 10 µm, the corrosion resistance after press hardening is decreased.

If the precoating thickness is more than 35 µm, alloying with iron from the steel substrate is more difficult in the external portion of the precoating, which increases the risk of the presence of a liquid phase in the heating step immediately preceding press hardening, hence the risk of pollution of rollers in the furnaces.

After providing the non-stamped precoated steel coil, sheet or blank, it is heated in a furnace up to a temperature $\theta_1$. The furnace can be a single zone or a multizone furnace, i.e. having different zones which have their own heating means and settings. Heating can be performed by means such as radiant tubes, radiant electric resistances or by induction. The furnace atmosphere must contain at least 5% oxygen so to be able to create an alumina-containing oxide layer at the extreme surface of the steel coil, sheet or blank, as will be explained below.

It is heated up to a maximum furnace temperature $\theta_1$ comprised between 750 and 1000° C. This causes the transformation, at least partially, of the initial steel microstructure, into austenite. Below 750° C., the prealloying between the precoating and the steel substrate would be very long and not cost-efficient. Above 1000° C., the cooling following immediately $\theta_1$ could generate microstructures in the substrate with high hardness, which would make difficult some further steps, such as cutting, piercing, trimming or uncoiling. Furthermore, above 1000° C., the holding duration at this temperature must be limited in order to avoid grain coarsening and toughness decrease. If the production line stops for an unexpected reason, the blanks situated in the furnace would be held for a too long time and would be discarded, which is not cost-efficient.

The non-stamped steel coil, sheet or blank is thus maintained at temperature $\theta_1$ for a duration $t_1$ in the furnace. An interdiffusion layer, located at the interface between the pre-coating and the steel substrate is thus obtained at the end of $t_1$. It has been experienced that the thickness of this interdiffusion layer does not significantly change during the further heating and maintain at $\theta_2$. This interdiffusion layer has a ferritic structure ($\alpha$-Fe), is enriched with aluminium in solid solution, it may also include silicon in solid solution. For example, this ductile layer can contain less than 10% Al in weight and less than 4% Si in weight, the remainder being mainly Fe.

The total duration time in the furnace $t_1$ must be comprised in a range ($t_{1min}$–$t_{1max}$) defined as follows:

$$t_{1min} = 23500/(\theta_1 - 729.5) \quad \text{(expression [1])}$$

$$t_{1max} = 4.946 \times 10^{41} \times \theta_1^{-13.08} \quad \text{(expression [2])}$$

wherein $\theta_1$ is expressed in ° C. and $t_{1min}$ and $t_{1max}$ are expressed in seconds.

If the coil, sheet or blank is heated in a furnace with a unique heating zone, $\theta_1$ designates the furnace temperature. Alternatively, the coil, sheet or blank can be heated in a furnace comprising different heating zones, each zone (i) having its own temperature $\theta_1(i)$. Thus, a maximum temperature $\theta_1(\max)$ and a minimum temperature $\theta_1(\min)$ are defined inside the furnace. In this case, the expression [1] is calculated by using $\theta_1(\min)$ and the expression [2] is calculated by using $\theta_1(\max)$ When the duration $t_1$ is less than $t_{1min}$, the amount of diffusion between the steel substrate and the precoating is insufficient. Thus, there is a risk that the further heating at temperature $\theta_3$ causes the formation of liquid phase on the surface of the coating and pollution of the rollers in the furnace.

Furthermore, when heating duration is less than $t_{1min}$, the thickness of the alumina-containing oxide layer which is present on the non-stamped prealloyed coil, sheet or blank, is insufficient, i.e. less is than 0.10 μm. Referring to the variation of oxygen content from the surface, this value corresponds to the full width at half maximum, as defined in "Glow Discharge Optical Emission Spectroscopy: A Practical Guide", by T. Nellis and R. Payling, Royal Society of Chemistry, Cambridge, 2003.

Without being bound by a theory, it is believed that the formation of this superficial alumina-containing oxide layer occurs by a reaction between the adsorbed oxygen and the aluminum at the precoating surface, in the high temperature range of the whole manufacturing process of the prealloyed coil, sheet or blank. The amount of oxygen necessary for this reaction is partially generated by the decomposition of water present in the furnace atmosphere. As the decomposition of adsorbed water at the precoating surface causes the generation of adsorbed hydrogen, the hydrogen content in the steel substrate increases after the heating and holding at $\theta_1$. However, as will be explained, in a second step performed in the process, the hydrogen content will be lowered and the alumina-containing layer which has been created will make it possible that no more significant hydrogen intake will occur in a third heating step.

This alumina-containing layer can be a complex layer, i.e. for example a layer of alumina ($Al_2O_3$) topped by oxihydroxide alumina (AlOOH).

When $t_1$ is outside of the range ($t_{1min}$–$t_{1max}$), the interdiffusion layer thickness can be outside of the 2-16 μm range. This, in turn, causes a risk that the coating structure of the final press hardened part is not well adapted to resistance spot welding, i.e. that the welding intensity range is below 1 kA.

Furthermore, when $t_{1max}$ is exceeded, the corrosion resistance of the final press hardened coated part tends to decrease.

After holding at $\theta_1$, the non-stamped steel coil, sheet or blank is cooled down at an intermediate temperature $\theta_i$.

As the steel microstructure has been transformed, at least partially, into austenite, it is preferred that the cooling rate $V_{r1}$ is selected so to not generate hard transformation constituents such as martensite or bainite, during this cooling step. In particular, the cooling rate is selected so that the sum of the area fractions of bainite and martensite is less than 30% in the steel microstructure. To this end, $V_{r1}$ is preferably not higher than 10° C./s.

It is further even preferred that the cooling is selected so as to obtain a ferrite-pearlite microstructure which makes it possible to perform eventual operations such as cutting, trimming, piercing or uncoiling. The selection of this cooling rate can be performed for example through the implementation of a limited number of tests on a dilatometer, determining the proper critical cooling rates that make it possible to obtain such microstructural features. To this end, $V_{r1}$ is preferably not higher than 5° C./s, and more preferably not higher than 3°C/s.

Furthermore, if cooling is performed at slow rate, the growth of the alumina-containing oxide layer can continue to take place in the high temperature range.

The intermediate temperature $\theta_i$ can be either room temperature, or can be higher than room temperature.

In the first case, the non-stamped steel coil, sheet or blank is thereafter heated from room temperature up to a temperature $\theta_2$ comprised between 100 and 500° C.

In the second case, the non-stamped steel coil, sheet or blank heated at $\theta_1$ is directly transferred in a furnace heated at temperature $\theta_2$ comprised between 100 and 500° C., i.e. $\theta_i = \theta_2$. In this furnace, the atmosphere contains at least 5% oxygen.

Whatever the first or second embodiment, after maintaining at the temperature $\theta_2$ for a duration $t_2$ comprised between 3 and 45 minutes, a non-stamped prealloyed steel coil, sheet or blank, is obtained.

The maintaining step at $\theta_2$ is also an important step in the manufacturing process: after the heating and maintaining at $\theta_1$, hydrogen is present in the steel substrate due to the adsorption at the precoating surface of the water vapor from the furnace. At this stage, the amount of diffusible hydrogen in the steel depends mainly on the dew point of the furnace atmosphere when heating at $\theta_1$, on the temperature $\theta_1$, itself and on the duration $t_1$. The amount of diffusible hydrogen can be high due to the increased hydrogen solubility at high temperature. Values of diffusible hydrogen in the range of 0.35-0.50 ppm can be measured for example at this stage.

When the coil, sheet or blank is cooled from $\theta_1$, the hydrogen solubility decreases and hydrogen tends to desorb. However, when the temperature is less than 100° C., it has been experienced that the prealloyed coating acts as a barrier for hydrogen, thus that hydrogen desorption is very limited.

The inventors have found that maintaining the non-stamped coil, sheet or blank, in a range between 100 and 500° C., for a duration comprised between 3 and 45 minutes, makes it possible to obtain an efficient desorption rate.

As a first preferred embodiment, the inventors have found that maintaining at a temperature $\theta_2$ higher than 400° C. and lower than 500° C., is advantageous since it makes it possible to achieve an average diffusible hydrogen content on the final press hardened coated part, less than 0.25 ppm.

As a second preferred embodiment, the inventors have found that maintaining at $\theta_2$ at a temperature higher than 100° C. and lower than 300° C. is also advantageous since it makes it possible to achieve an average diffusible hydrogen content on the final press hardened coated part, less than 0.28 ppm.

As a third preferred embodiment, the inventors have found that maintaining at $\theta_2$ at a temperature comprised between 300 and 400° C. is very advantageous, since this range makes it possible to obtain low average diffusible hydrogen with short duration time $t_2$.

Whatever the preferred temperature range for $\theta_2$, a duration $t_2$ comprised between 4 and 15 minutes makes it possible to obtain an average diffusible hydrogen on the final press hardened coated part, less than 0.25 ppm with a short duration, i.e. in conditions advantageous for cost production.

After maintaining at $\theta_2$, as a first alternative, the coil, sheet or blank can be cooled down to room temperature so to obtain a non-stamped prealloyed steel coil, sheet or blank. Thus, it can be stored at this temperature until further heating at temperature $\theta_3$ in the manufacturing of a press hardened part. At this stage, the prealloyed coil or sheet is cut so to obtain a non-stamped prealloyed blank, the shape contour of which is related to the geometry of the final press hardened part.

As a second alternative, the product maintained at $\theta_2$ is under the form of a prealloyed blank which can be thereafter directly heated at $\theta_3$ without cooling at room temperature.

At this stage, the prealloyed steel product is covered by a precoating wherein no free aluminum is present, i.e. aluminum is bound to other elements. The average diffusible content of this product is less than 0.35 ppm, and can be less than 0.25 ppm.

Furthermore, as will be shown below, the alumina-containing oxide layer created in the high temperature range during the previous steps makes it possible that further heating for press hardening does not cause a significant hydrogen intake.

Whatever the first or second alternative above, the non-stamped prealloyed steel blank is thereafter heated to a temperature $\theta_3$ for a total duration $t_3$, so to obtain partial or total austenitic structure in the steel substrate. Preferably, $\theta 3$ is comprised between 850 and 1000° C.

Fast heating is performed at this step in order to limit austenite grain growth and to implement a process in very productive conditions. In this heating step, the heating duration $\Delta T_{20-700°}$ which designates the time elapsed between 20 and 700° C., expressed in s, is less than $((26.22 \times th) - 0.5)$ In this expression, th designates the thickness of the prealloyed blank, expressed in millimeters. If the blank has a variable thickness between $th_{min}$ and $th_{max}$, th designates $th_{max}$.

Thanks to the prior prealloying treatment, the heating step at $\theta_3$ does not cause the formation of liquid phase in the coating. Thus, if the prealloyed blank is heated in a furnace on rollers, the pollution of the rollers by liquid, is avoided.

As no formation of liquid phase occurs, efficient heating processes can be implemented such as resistance heating, i.e. processes based on Joule effect, or induction heating. As alternative processes, heating by thermal conduction can be implemented, for example by putting in contact the prealloyed blank between two heated plates ("plate heating") The prior prealloying suppresses the risk of molten phase presence causing sticking between the blank and the plates.

Thanks also to the prior prealloying treatment, the heating step at $\theta_3$ can be performed at a high heating rate.

Thanks also to the prior prealloying treatment, the average diffusible hydrogen increase $\Delta H_{diff}$ during the heating and maintaining step at $\theta_3$ is reduced to less than 0.10 ppm, and the average diffusible hydrogen content of the press hardened part is less than 0.40 ppm and can be less than 0.30 ppm.

After maintaining at $\theta_3$, the heated blank is transferred rapidly into a forming press and hot formed so to obtain a part. The part is then kept within the press tooling so as to ensure a proper cooling rate and to avoid distortions due to heterogeneities in shrinkage and phase transformations. The part mainly cools by conduction through heat transfer with the tools. The tooling can include coolant circulation so as to increase the cooling rate, or can include heating cartridges so as to lower cooling rates. Thus, the cooling rates can be adjusted precisely by taking into account the hardenability of the substrate composition through the implementation of such means. The cooling rate may be uniform in the part or may vary from one zone to another according to the cooling means, thus making it possible to achieve locally increased strength or increased ductility properties.

For achieving high tensile stress, the microstructure in the hot formed part comprises martensite or bainite. The cooling rate is chosen according to the steel composition, so as to be higher than the critical martensitic or bainitic cooling rate, depending on the microstructure and mechanical properties to be achieved. In particular, as a preferred embodiment, the microstructure contains more than 80% of martensite and/or bainite, so to take advantage of the structural hardening capacity of the steel.

Example

Sheets of 22MnB5 steel, 1.5 mm thick, have been provided with the composition of table 1. Other elements are iron and impurities inherent in processing.

TABLE 1

| Steel composition (weight %) | | | | | | | | | |
|---|---|---|---|---|---|---|---|---|---|
| C | Mn | Si | Al | Cr | Ti | B | N | S | P |
| 0.22 | 1.16 | 0.26 | 0.030 | 0.17 | 0.035 | 0.003 | 0.005 | 0.001 | 0.012 |

The sheets are obtained from coils which have been precoated with Al—Si through continuous hot-dipping, then cut into blanks. The precoating thickness is 25 μm on both sides. The precoating contains 9% Si in weight, 3% Fe in weight, the remainder being aluminum and impurities resulting from smelting.

The flat blanks have been subjected to different heat treatments according to the manufacturing conditions mentioned in table 2.

The heat treatment up to the temperature $\theta_1$ has been performed in a furnace under an atmosphere containing 21% oxygen while maintaining the blanks for different values of total dwell time $t_1$. The values of $t_{1min}$ and $t_{1max}$ have been calculated from temperature $\theta_1$ according to the expressions [1] and [2] above, and the values of $t_1$ have been compared to the range defined by $t_{1min}$ and $t_{1max}$. After holding at this temperature, the blanks have been cooled down to room temperature by natural convection and radiation, so to obtain ferrite-pearlite microstructure. The blanks have been thereafter heated up to temperatures $\theta_2$ ranging up to 600° C. and have been maintained at this temperature for a duration $t_2$ comprised between 4' and 24 h, under an atmosphere containing 21% oxygen. Thus, non-stamped prealloyed blanks have been obtained.

As further comparison, a precoated steel blank has been press hardened without having undergone the prealloying treatment at $\theta_2$ and $\theta_3$. This test corresponds to reference R6 in table 2.

TABLE 2

Manufacturing conditions.

| Test | $\theta_1$ (° C.) | $t_1$ | $t_1$ comprised between $t_{1min}$ and $t_{1max}$? | $\theta_2$ (° C.) | $t_2$ | $\Delta t20\text{-}700°$ (s) | $\theta_3$ (° C.) | $t_3$ (° C.) |
|---|---|---|---|---|---|---|---|---|
| I1 | 900 | 4' | Yes | 250 | 40' | 35 | 900 | 1'40" |
| I2 | 900 | 4' | Yes | 250 | 40' | 35 | 900 | 2'30" |
| I3 | 900 | 4' | Yes | 500 | 4' | 35 | n.a. | n.a. |
| I4 | 900 | 4' | Yes | 500 | 15' | 35 | n.a. | n.a. |
| I5 | 900 | 5'30" | Yes | 350 | 15' | 35 | 900 | 1'40" |
| I6 | 900 | 5'30" | Yes | 350 | 15' | 35 | 900 | 6' |
| R1 | 900 | <u>2'</u> | <u>No</u> | 350 | 15' | n.a. | 900 | 1'40" |
| R2 | 900 | <u>2'</u> | <u>No</u> | 350 | 15' | n.a. | 900 | 2'30" |
| 90729 | 900 | <u>4'</u> | Yes | <u>600</u> | 4' | 35 | n.a. | n.a. |
| R4 | 900 | 4' | Yes | <u>20</u> | <u>24 h</u> | 35 | 900 | 1'40" |
| R5 | <u>700</u> | <u>40'</u> | <u>No</u> | <u>250</u> | <u>40'</u> | 35 | 900 | 1'40" |
| R6 | — | — | — | — | — | <u>95</u> | 900 | 6' |

Underlined values: not according to the invention
n.a.: not applicable or not assessed Characteristic features of the non-stamped prealloyed blanks before heating at $\theta_3$ have been determined and reported in Table 3:

the thickness of the interdiffusion layer has been determined by cutting, polishing, etching specimens with Nital reagent, and optical microscope observations at a magnification of 500×. The interdiffusion layer is identifiable due to its ferritic structure;

the thickness and the features of the alumina-containing oxide layer atop the prealloyed coating have been observed through Glow Discharge Optical Emission Spectroscopy technique and by Secondary Ion Mass Spectrometry, which are techniques known by themselves. The latter technique is implemented using a monochromatic aluminum source and makes it possible to identify the oxidation state of aluminum in the top surface layer, 0.01 μm thick, of the prealloyed coating;

the diffusible hydrogen has been measured by Thermal Desorption Analysis which is also a technique known per se: the specimen to be measured is placed in a furnace and infrared heated. Temperature is continuously recorded during heating. The released hydrogen is carried by nitrogen gas and measured by a spectrometer. Diffusible hydrogen is quantified by integrating the hydrogen released between room temperature and 360° C. The average diffusible hydrogen is obtained by the average value of N individual measurements, N being comprised between 3 and 9. The average diffusible hydrogen has been measured on prealloyed coated steel blanks before heating at $\theta_3$, and on press hardened coated parts. The difference $\Delta H_{diff}$ between these two measured values expresses the hydrogen intake due to the press hardening process.

The prealloyed coated blanks have been heated up to temperature $\theta_3$ and the presence of an eventual liquid phase has been checked. If liquid phase has been present during heating, the coating surface appearance, as observed by Scanning Electron Microscope, is very smooth due to surface tension of the liquid.

At $\theta_3$=900° C., the structure of the steel is fully austenitic. The blanks have been transferred within 10 s in a press, hot formed and press hardened. Cooling in the press is performed so to ensure that the steel microstructure of the press hardened coated parts, is fully martensitic.

After press hardening, the coated steel parts are cut, polished, etched with Nital reagent and observed by optical microscope at a magnification of 500×. The coating structure is observed to determine if it displays a distinct four-layer structure adapted for resistance welding, such as described in WO2008053273, i.e. ranging from the steel substrate to the coating surface:

an interdiffusion layer
an intermediate layer
an intermetallic layer
a superficial layer The press hardened coated parts have a yield stress higher than 1000 MPa.

The characteristic features of the press hardened parts are also reported in Table 3.

TABLE 3

Characteristic features of prealloyed blanks and press hardened parts

| | Absence of free aluminum before heating at $\theta_3$ | Average diffusible hydrogen of the prealloyed blanks before $\theta_3$ (ppm) | Interdiffusion layer thickness of the prealloyed blanks before $\theta_3$ (ppm) | Thickness of alumina containing oxide layer before $\theta_3$ (μm) | Absence of liquid phase when heating at $\theta_3$ | Average diffusible hydrogen content of the press hardened part (ppm) | Average ΔHdiff (ppm) | Presence of a four layered structure adapted to spot welding |
|---|---|---|---|---|---|---|---|---|
| I1 | Yes | 0.2 | 4 | n.a. | Yes | 0.21 | 0.01 | Yes |
| I2 | Yes | 0.2 | 4 | n.a. | Yes | 0.21 | 0.01 | Yes |
| I3 | Yes | 0.21 | 4 | n.a. | n.a. | n.a. | n.a. | n.a. |
| I4 | Yes | 0.15 | 4 | n.a. | n.a. | n.a. | n.a. | n.a. |
| I5 | Yes | 0.14 | 5 | 0.17 | Yes | 0.20 | 0.06 | Yes |

TABLE 3-continued

Characteristic features of prealloyed blanks and press hardened parts

| | Absence of free aluminum before heating at $\theta_3$ | Average diffusible hydrogen of the prealloyed blanks before $\theta_3$ (ppm) | Interdiffusion layer thickness of the prealloyed blanks before $\theta_3$ (ppm) | Thickness of alumina containing oxide layer before $\theta_3$ (μm) | Absence of liquid phase when heating at $\theta_3$ | Average diffusible hydrogen content of the press hardened part (ppm) | Average ΔHdiff (ppm) | Presence of a four layered structure adapted to spot welding |
|---|---|---|---|---|---|---|---|---|
| I6 | Yes | 0.14 | 5 | 0.17 | Yes | 0.20 | 0.06 | Yes |
| R1 | No | 0.11 | 1 | n.a | No | 0.28 | 0.17 | No |
| R2 | No | 0.11 | 1 | n.a. | No | 0.35 | 0.24 | No |
| R3 | Yes | 0.38 | 4 | n.a. | Yes | n.a. | n.a. | n.a. |
| R4 | Yes | 0.37 | 4 | n.a. | Yes | 0.40 | 0.03 | Yes |
| R5 | Yes | 0.36 | 5 | n.a. | Yes | 0.41 | 0.05 | No |
| R6 | No | 0.05 | n.a. | 0.01 | No | 0.40 | 0.35 | Yes |

Underlined values: not according to the invention
n.a.: not applicable or not assessed.

In tests I1 and I2, non-stamped prealloyed blanks have been fabricated according to the conditions of the invention, and further press hardened according to the conditions of the invention. No free aluminum is present on the prealloyed blanks. No liquid phase has been experienced during the heating at $\theta_3$ in spite of the short heating duration.

The average hydrogen intake due to the heating at $\theta_3$ is very low (0.01 ppm), as well as the average hydrogen itself (0.21 ppm). Thus, the risk of delayed fracture is much decreased due to the low hydrogen content. Furthermore, it is demonstrated that even if the blanks are left for a longer duration in the furnace (from 1'40" to 2'30" in trials I1 and I2), no supplementary hydrogen intake $\Delta H_{diff}$ occurs. Thus, even if the prealloyed blanks have to stay for a longer duration in furnace due to an unexpected event in production line, this has no detrimental consequence.

The coating structure after press hardening is similar to the one described in than WO2008053273, making it possible to achieve a wide intensity range in resistance spot welding.

In tests I3-I4, the non-stamped prealloyed blanks have been fabricated with higher $\theta_2$ temperature and shorter $t_2$ duration than in tests I1 and I2. This makes it possible to obtain prealloyed blanks which have an average diffusible content the same or smaller (0.15-0.21 ppm) than the one in tests I1 and I2.

Figure 2:
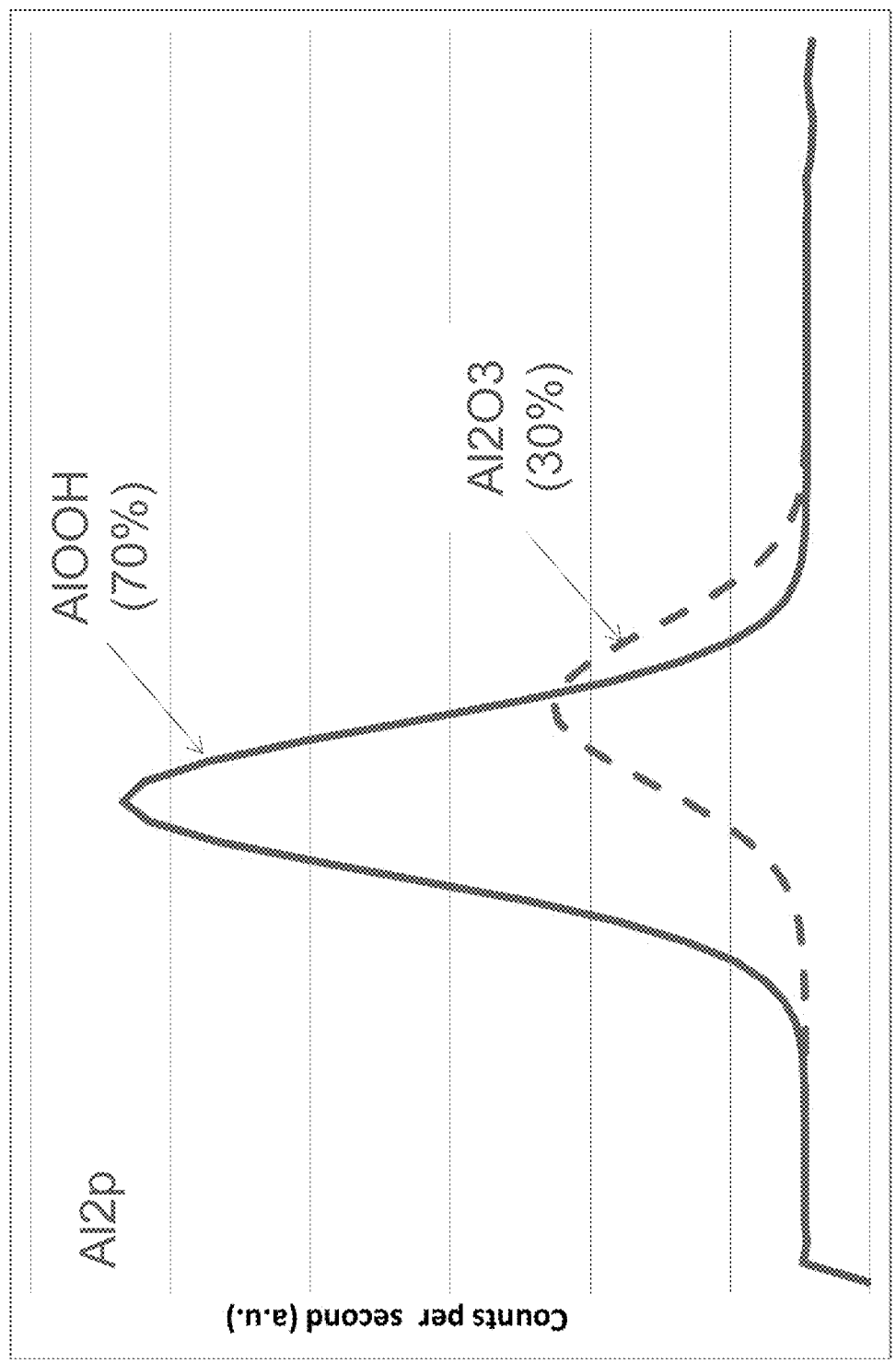
FIG. 2 illustrates the oxidation state of aluminum at the extreme layer (i.e. from 0 to 0.01 µm under the coating surface) of the coating of a non-stamped prealloyed steel blank according to the invention, as measured by X-Ray Photoelectron Spectroscopy.

In tests I5-I6, according to the conditions for ($\theta_1$, $t_1$, $\theta_2$, $t_2$), an alumina-containing oxide layer, 0.17 μm thick together with an average diffusible hydrogen content of 0.14 ppm, has been created. As illustrated by FIG. 1, this thickness value corresponds to the full width at half maximum of O content. FIG. 1 evidences that Fe and Si can be also present at a certain distance from the surface. At its extreme surface, i.e. from 0 to 0.01 μm under the surface of the coating as shown on FIG. 2, this layer is composed of 30% $Al_2O_3$ topped by AlOOH, Boehmite type, the presence of which results from the specific thermal cycle and the presence of oxygen and water vapor in the furnace. After holding at 350° C. for 15', the average diffusible hydrogen content of the prealloyed blank is about the same as in test I4. The hydrogen intake ΔHdiff is less than 0.06 ppm, which makes it possible to obtain a press hardened part with an average diffusible hydrogen of only 0.20 ppm. Furthermore, increasing $t_3$ from 1'40" (I5) to 6' (I6) does not lead to increased diffusible hydrogen in the press hardened part. Thus, even if the prealloyed blanks have to stay for a longer duration in furnace before hot stamping, no detrimental effect is experienced.

These properties are obtained with high productivity conditions, i.e. with a fast heating rate Δt20-700° (s) of 35 s. The coating structure after press hardening is similar to the one described in than WO2008053273. It is also mentioned that the heat treatment step ($\theta_3$, $t_3$) does not modify significantly the alumina-containing layer: before heating at ($\theta_3$=900° C., $t_3$=1'40"), the alumina-containing layer has a thickness of 0.17 μm, after heating at ($\theta_3$, $t_3$) and press hardening, the alumina-containing layer has a thickness of 0.18 μm, with similar microstructural features.

For all the tests I1-I6, the ferrite-pearlite microstructure of the prealloyed blanks makes it possible to perform piercing and cutting easily.

In the tests R1-R2, the holding time $t_1$ is not sufficient to create an interdiffusion layer of at least 2 μm. Thus, free aluminum is present in the prealloyed blank and melting occurs on the precoating when heating at $\theta_3$. Furthermore, the alumina containing layer is insufficient to prevent significant hydrogen intake ΔHdiff during press hardening. This intake is especially high when the holding duration $t_3$ is longer.

In the test R3, although ($\theta_1$, $t_1$) have been chosen according to the invention, the temperature $\theta_2$ is too high. Without being bound by a theory, it is believed that this can be due to the hydrogen solubility which is still high at this temperature, or to water adsorption which is present at this temperature. As a consequence, the diffusible hydrogen content is too high in the prealloyed blank.

In the test R4, although ($\theta_1$, $t_1$) have also been chosen according to the invention, the temperature $\theta_2$ is too low, thus hydrogen effusion is insufficient since the coating acts as a barrier for hydrogen desorption. As a consequence, the diffusible hydrogen content is too high in the prealloyed blank.

In the test R5, since ($\theta_1$, $t_1$) are outside the conditions of the invention, the diffusible hydrogen on the prealloyed blank and the press hardened are too high, even though ($\theta_2$, $t_2$), ($\theta_3$, $t_3$) are according to the conditions of the invention.

In the test R6, no prealloying steps have been applied. Thus liquid phase is present during heating at $\theta_3$. Even though the average diffusible is low before heating at $\theta3$, the thickness of its alumina-containing oxide on the top of the coating is insufficient (0.01 µm), thus the average diffusible hydrogen in the final part is not less than 0.40 ppm.

Thus, the press hardened coated steel parts manufactured according to the invention can be used with profit for the fabrication of structural or safety parts of vehicles.

What is claimed is:

1. A method for manufacturing a non-stamped prealloyed steel coil, sheet or blank, comprising the following successive steps:
providing a non-stamped precoated steel coil, sheet or blank composed of a heat treatable steel substrate covered by a precoating of aluminum or an aluminum-based alloy, the aluminum-based alloy being defined as an alloy wherein aluminum is a largest element in weight percentage of the aluminium-based alloy, the precoating resulting directly from a hot-dip aluminizing process without additional heat treatment, wherein a thickness of the precoating thickness is between 10 and 35 micrometers on each side of the steel coil, sheet or blank, then
heating the non-stamped precoated steel coil, sheet or blank in a furnace under an atmosphere containing at least 5% oxygen, up to a temperature $\theta_1$ between 750 and 1000° C., for a duration $t_1$ comprised between $t_{1min}$ and $t_{1max}$, wherein:

$t_{1min} = 23500/(\theta_1 - 729.5)$ and $t_{1max} = 4.946 \times 10^{41} \times \theta_1^{-13.08}$, $t_1$ designating a total duration in the furnace, $\theta_1$ being expressed in ° C. and $t_{1min}$ and $t_{1max}$ being expressed in seconds, then cooling the non-stamped steel coil, sheet or blank at a cooling rate $V_{r1}$ down to a temperature $\theta_i$, wherein the cooling rate $V_{r1}$ is selected so that a sum of the area fractions of bainite and martensite is less than 30% in the steel substrate, after the cooling and before subsequent heating, then
maintaining the non-stamped steel coil, sheet or blank at a temperature $\theta_2$ comprised between 100 and 500° C., for a duration $t_2$ between 3 and 45 minutes, so as to obtain a diffusible hydrogen content less than 0.35 ppm.

2. The method as recited in claim 1 wherein the aluminum-based alloy is an aluminum alloy, the aluminum alloy defined by an alloy wherein the aluminum is higher than 50% in weight.

3. The method as recited in claim 1 wherein the non-stamped prealloyed steel coil, sheet or blank includes an interdiffusion layer between the steel substrate and the coating, with a thickness between 2 and 16 micrometers, the interdiffusion layer being a layer with an α(Fe) ferritic structure, having Al and Si in solid solution.

4. The method as recited in claim 1 wherein the non-stamped prealloyed steel coil, sheet or blank comprises an alumina-containing oxide layer over the precoating with a thickness higher than 0.10 µm.

5. The method as recited in claim 1 wherein the cooling rate $V_{r1}$ is selected so as to obtain a ferrite-pearlite structure in the steel substrate after the cooling and before subsequent heating.

6. The method as recited in claim 1 wherein said temperature $\theta_2$ is higher than or equal to 100° C. and lower than 300° C.

7. The method as recited in claim 1 wherein said temperature $\theta_2$ is higher than or equal to 300° C. and lower than or equal to 400° C.

8. The method as recited in claim 1 wherein said temperature $\theta_2$ is higher than 400° C. and less than or equal to 500° C.

9. The method as recited in claim 1 wherein the duration $t_2$ is between 4 and 15 minutes.

10. The method as recited in claim 1 wherein the temperature $\theta_i$ is equal to room temperature and wherein the non-stamped steel coil, sheet or blank, after cooling at room temperature, is heated up to said temperature $\theta_2$.

11. The method as recited in claim 1 wherein said temperature $\theta_i$ is equal to the temperature $\theta_2$.

12. The method as recited in claim 1 further comprising, immediately after maintaining the non-stamped steel coil, sheet or blank at a temperature $\theta_2$ between 100 and 500° C. for a duration $t_2$, cooling of the steel coil, sheet or blank down to room temperature.

13. A method for manufacturing a press hardened coated steel part, wherein:
providing the non-stamped prealloyed steel coil, sheet or blank according to the method as recited in claim 1;
if the non-stamped prealloyed steel sheet, coil or blank is in the form of coil or sheet, cutting the coil or sheet so to obtain the prealloyed steel blank, then
heating the non-stamped prealloyed steel blank such that the heating duration $\Delta T_{20-700°}$ between 20 and 700° C., expressed in s, is less than $((26.22 \times th) - 0.5)$, th being the thickness, expressed in millimeters, of the non-stamped prealloyed steel blank, up a temperature $\theta_3$, and maintaining the non-stamped prealloyed steel blank at said temperature $\theta_3$ for a duration $t_3$ so to obtain partial or total austenitic structure in the steel substrate, then
transferring the heated blank into a press, then
hot press forming the heated blank so to obtain a part, then
cooling the part while maintaining it in a press tooling, so as to obtain a microstructure in the steel substrate comprising at least martensite or bainite, and to obtain a press hardened coated part.

14. The method as recited in claim 13 wherein the non-stamped prealloyed steel blank is not cooled at room temperature between maintaining at said temperature $\theta_2$ and heating at said temperature $\theta_3$.

15. The method as recited in claim 13 wherein a difference $\Delta H_{diff}$ between the content of diffusible hydrogen in the press hardened coated part and the content of diffusible hydrogen in the non-stamped prealloyed blank, is less than 0.10 ppm.

16. The method as recited in claim 13 wherein the heating of the non-stamped prealloyed steel blank up a temperature $\theta_3$ is performed by a method selected among induction heating, resistance heating or conduction heating.

17. The method as recited in claim 13 wherein microstructure of the steel substrate of the press hardened coated part comprises more than 80% of martensite.

18. The method as recited in claim 13 wherein the press hardened coated part has a yield stress higher than 1000 MPa.

19. The method as recited in claim 13 wherein the press hardened coated part is used for the fabrication of structural or safety parts of vehicles.

* * * * *